US008161625B2

(12) United States Patent
Akita (10) Patent No.: US 8,161,625 B2
(45) Date of Patent: Apr. 24, 2012

(54) METHOD OF MANUFACTURING A ROTATING ELECTRIC MACHINE

(75) Inventor: Hiroyuki Akita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 766 days.

(21) Appl. No.: 12/275,032

(22) Filed: Nov. 20, 2008

(65) Prior Publication Data

US 2009/0133243 A1 May 28, 2009

(30) Foreign Application Priority Data

Nov. 22, 2007 (JP) ................................ 2007-303401

(51) Int. Cl.
*H02K 15/00* (2006.01)
*H01R 39/32* (2006.01)

(52) U.S. Cl. ........ 29/596; 29/598; 29/603.01; 29/603.2; 29/606; 29/609; 310/234

(58) Field of Classification Search ..................... 29/596, 29/598, 606, 609, 603.01, 603.2; 310/216, 310/234, 218, 270, 259, 102 R, 109, 133, 310/136, 134

See application file for complete search history.

(56) References Cited

U.S. PATENT DOCUMENTS

| | | | | |
|---|---|---|---|---|
| 5,592,731 A | * | 1/1997 | Huang et al. | ..................... 29/596 |
| 6,265,804 B1 | * | 7/2001 | Nitta et al. | ............. 310/216.066 |
| 6,369,687 B1 | | 4/2002 | Akita et al. | |
| 6,538,548 B2 | | 3/2003 | Akita et al. | |
| 6,794,786 B2 | * | 9/2004 | Enomoto et al. | ....... 310/216.088 |
| 7,466,055 B2 | | 12/2008 | Toide et al. | |
| 7,849,584 B2 | | 12/2010 | Toide et al. | |
| 2004/0051417 A1 | * | 3/2004 | Yamazaki et al. | ............ 310/216 |
| 2006/0163967 A1 | | 7/2006 | Yamamoto et al. | |
| 2006/0279160 A1 | | 12/2006 | Yoshinaga et al. | |
| 2008/0036311 A1 | | 2/2008 | Yamamoto et al. | |
| 2011/0047782 A1 | | 3/2011 | Toide et al. | |

FOREIGN PATENT DOCUMENTS

JP    5-3648 A    1/1993

(Continued)

OTHER PUBLICATIONS

Hiroyuki Akita et al., "Study on the Manufacturing Method of the Motor Cores to Reduce The Cogging Torque", Precision Engineering Magazine, Mar. 21, 2007, vol. 73, No. 6, pp. 711-716.

(Continued)

*Primary Examiner* — Derris Banks
*Assistant Examiner* — Tai Nguyen
(74) *Attorney, Agent, or Firm* — Buchanan Ingersoll & Rooney PC (57) ABSTRACT

There is provided a rotating electric machine capable of reducing torque pulsation, even when a slight stepped portion is present in an inner diameter shape of a stator core formed by allowing coupling split cores divided in every magnetic pole to be in an annular shape. The stator core is formed by stacking a plurality of laminates prepared by stack of coupling split core members formed by punching steel sheets in an annularly arranged shape in a state where the laminates are rotated one another by a predetermined angle. With such a configuration, it is possible to mutually offset torque pulsation components caused by the shape asymmetry of the laminates and reduce the torque pulsation components of the stator core on the whole.

10 Claims, 7 Drawing Sheets

FOREIGN PATENT DOCUMENTS

| | | |
|---|---|---|
| JP | 09-037492 A | 2/1997 |
| JP | 10-136618 A | 5/1998 |
| JP | 3316762 B1 | 6/2002 |
| JP | 3461552 B2 | 8/2003 |
| JP | 2004-350369 A | 12/2004 |
| JP | 2005-318763 A | 11/2005 |
| JP | 2005-341684 A | 12/2005 |
| JP | 2006-034100 A | 2/2006 |
| JP | 2006-211819 A | 8/2006 |
| JP | 2006-311738 A | 11/2006 |
| JP | 2007-020386 A | 1/2007 |
| WO | WO 2005-025037 A1 | 3/2005 |

OTHER PUBLICATIONS

Japanese Official Action dated Feb. 14, 2012 issued in the corresponding Japanese Patent Application No. 2007-303401.

* cited by examiner

VECTOR OF
FIRST GROUP

Fig. 9B

VECTOR OF
SECOND GROUP

Fig. 9C

VECTOR OF
ENTIRE LAMINATES

Fig. 10A

8 POLES AND 12 SLOTS

Fig. 10B

10 POLES AND 12 SLOTS

VECTOR OF
FIRST GROUP

Fig. 14B

VECTOR OF
SECOND GROUP

Fig. 14C

VECTOR OF
ENTIRE LAMINATES

METHOD OF MANUFACTURING A ROTATING ELECTRIC MACHINE

BACKGROUND OF THE INVENTION

1. Field of the Invention

The present invention relates to a rotating electric machine capable of suppressing torque pulsation and a method of manufacturing the rotating electric machine and particularly to split cores mainly used for improvement in motor efficiency or productivity.

2. Description of the Background Art

Split cores are formed by punching steel sheets with a press mold to prepare split core members, stacking the plurality of split core members, fixing the stacked split core members by caulking, as disclosed in Patent Document 1 [Japanese Patent No. 3461552 (third page and FIG. 1)], for example. A stator core is prepared by winding a coil around magnetic pole teeth (magnetic tooth portions) of the split cores with insulation sheets interposed therebetween, assembling the coiled split cores in an annular shape, and fixing the split cores assembled in the annular shape within a frame.

Since the split cores are wound in a state where the split cores are separated, the coil can be wound with high density without a waste of a space through which a nozzle winding the coil passes, compared to a coil wound around an integrated core which is not divided. Accordingly, it is possible to improve torque thanks to an increase in the number of wound coils or to reduce the electroresistance caused upon mounting coils having a larger cross-section area, thereby improving motor torque or performance such as efficiency.

There has been increased a demand for reducing torque pulsation in order to improve accuracy or comfortableness in a driving motor used for a machine tool, an electrically-driven power steering of a passenger car, and an elevator, for example. The torque pulsation is caused by various factors such as an error in an inner circumferential shape of a stator core, a declination of magnetoresistance of a stator core, a declination of a magnetomotive force of a rotor, and a shaft deviation between a stator and a rotor.

When the annular stator core is obtained by assembling the split cores, boundaries of the split cores come in contact with each other to determine the respective positions of the split cores one another. However, a small stepped portion occurs in the inner circumferential shape of the split cores due to an error in process accuracy or assembly of the split cores. When the small stepped portion exists in the inner circumferential shape of the split cores, permeance of a magnetic path formed between a stator and a rotor is locally increased. Therefore, a problem occurs in that the torque pulsation increases.

In order to improve the assembly accuracy of the split cores, improvement in the assembly accuracy was intended with a coupling split core in which the split cores rotatably connected to each other. Even in this case, however, a stepped portion occurs in the inner circumferential shape due to an error in the location of rotation center of a connection portion or mismatch of the shape of the split cores. In addition, the assembly accuracy is not sufficient to suppress the torque pulsation. Moreover, when a request for reducing the torque pulsation is strict, a machining accuracy has to be further improved or grinding and finishing on the inner circumference are necessary after the assembly. Therefore, a problem occurs in that manufacture cost increases.

A steel sheet has magnetic anisotropy in which magnetoresistance is different in a rolling direction and a direction perpendicular to the rolling direction. Therefore, when the split cores are arranged to be integrally punched, the magnetoresistance is not uniform in a direction of magnetic pole tooth portions. For that reason, a problem occurs in that the torque pulsation increases even though there is no error caused in processing and assembling.

SUMMARY OF THE INVENTION

An object of the invention is to provide a rotating electric machine capable of reducing toque pulsation caused by presence of a shape asymmetry such as step in an inside diameter shape of a stator core assembled in an annular shape with coupling split cores in which so-called split cores divided according to every magnetic pole are rotatably connected to the adjacent split cores in its parts through connection portion.

According to an aspect of the invention, there is provided a method of manufacturing a rotating electric machine in which a rotor is formed by fixing a rotor core having p number of magnetic poles around a shaft which is a rotational axis, m number of split cores are formed by stacking a plurality of split core members which each include a yoke portion and a magnetic pole tooth portion protruding from the yoke portion inward in a radial direction, a stator core is formed by rotatably connecting ends of the split cores adjacent to each other upon arranging the m number of split cores in an annular shape, and a stator is formed by winding a coil around the respective split cores included in the stator core, and the stator is disposed in an annular shape around an outer circumference of the rotor. The method includes: punching from a steel sheet in an annularly arranged shape the m number of split core members A each of which include the yoke portion including a first end on one end side in a circumferential direction, a second end having a shape different from the shape of the first end to complement the first end on the other end side in the circumferential direction and a caulking concavo-convex portion on a surface of the first end, and the magnetic pole tooth portion protruding from the yoke portion inward in a radial direction; forming the split core members B in which locations of a first end and a second end in a circumferential direction are reverse to those in the split core members A by the same punching as that in the split core members A, and forming m the number of split cores by alternatively stacking the split core members A and the split core members B to a predetermined thickness while maintaining the annularly arranged shape in the punching to form n number of (where $n \geq 2$) annularly arranged laminates, by matching an i-th annularly arranged laminate among the n number of annularly arranged laminates with a first annularly arranged laminate at a location of the magnetic pole tooth portions in the circumferential direction, and by stacking the i-th annularly arranged laminate in a state where the i-th annularly arranged laminate is rotated in a certain direction by a predetermined angle $\alpha i$ (where $0 < \alpha i < 2\pi$ and i=2 to n) with respect to the first annularly arranged laminate; and forming the stator core so as to arrange the rotatably connected split cores in the annular shape by rotatably connecting the adjacent split cores one another by the caulking concavo-convex portions formed on the surface of the first ends of the yokes of the split cores in an overlapped portion in which the first ends of the yokes of the split cores overlap in a stack direction with the first ends of the yokes of the adjacent split cores in the circumferential direction.

According to another aspect of the invention, there is provided a method of manufacturing a rotating electric machine in which a rotor is formed by fixing a rotor core having p number of magnetic poles around a shaft which is a rotational axis, m number of split cores are formed by stacking a plurality of split core members which each include a yoke portion and a magnetic pole tooth portion protruding from the yoke portion inward in a radial direction, a stator core is formed by connecting the adjacent split cores one another, and a stator is formed by winding a coil around the respective split cores included in the stator core, and the stator is disposed in an annular shape around an outer circumference of the rotor. The method includes: punching from a steel sheet in an annularly arranged shape the m number of split core members A each of which include the yoke portion including a first end on one end side in a circumferential direction, a second end having a shape different from the shape of the first end to complement the first end on the other end side in the circumferential direction and a caulking concavo-convex portion on a surface of the first end, and the magnetic pole tooth portion protruding from the yoke portion inward in a radial direction; forming at least one annularly arranged laminate A0 formed by stacking the m number of split core members A to a predetermined thickness while maintaining the annularly arranged shape in the punching, forming the split core members B in which locations of a first end and a second end in a circumferential direction are reverse to those in the split core members A by the same punching as that in the split core members A, and forming at least one annularly arranged laminate B0 formed by stacking the m number of split core members B to a predetermined thickness while maintaining the annularly arranged shape in the punching, to form n number of (where n≧2) laminates obtained by the sum of the annularly arranged laminates A0 and the annularly arranged laminates B0; forming the m annularly arranged split cores by matching an i-th annularly arranged laminate among the n number of annularly arranged laminates with a first annularly arranged laminate at a location of the magnetic pole tooth portions in the circumferential direction and by stacking the i-th annularly arranged laminate in a state where the i-th annularly arranged laminate is rotated in a certain direction by a predetermined angle αi (where 0<αi<2π and i=2 to n) with respect to the first annularly arranged laminate; and forming the stator core so as to arrange the rotatably connected split cores in the annular shape by rotatably connecting the adjacent split cores one another by the caulking concavo-convex portions formed on the surface of the first ends of the yokes of the split cores in an overlapped portion in which the first ends of the yokes of the split cores overlap in a stack direction with the first ends of the yokes of the adjacent split cores in the circumferential direction.

According to still another aspect of the invention, a rotating electric machine includes a rotor including a shaft as a rotational axis and a rotor core with a plurality of magnetic poles fixed around the shaft and a stator formed by winding a coil around a stator core formed by rotatably connecting ends of adjacent split cores when the plurality of split cores formed by stacking a plurality of split core members which includes a yoke portion and a magnetic pole tooth portion protruding from the yoke portion inward in a radial direction, and in which the stator is disposed in an annular shape around an outer circumference of the rotor. The annularly arranged split cores are formed by stacking n number of annularly arranged laminate formed by stack of the split core members by a predetermined thickness in a stack direction. In addition, the n number of annularly arranged laminates have a common shape asymmetry, and an i-th annularly arranged laminate is matched with the first annularly arranged laminate at a location of the magnetic pole tooth portions in a circumferential direction and stacked in a state where the i-th annularly arrange laminated is rotated by a predetermined angle αi (where 0<αi<2π and i=2 to n) with respect to the first annularly arranged laminate for the characteristic of the shape asymmetry. In addition, ends of the yoke portion of each split core include a first end and a second end which have different and complement shapes in the stack direction. In the split cores adjacent to each other upon arranging the split cores in the annular shape, adjacent ends in every layer come in contact with each other and have overlapped portions in the stack direction in the ends of the adjacent split cores and in the vicinity of the ends, and the adjacent split cores are rotatably connected to each other by caulking concavo-convex portions formed on the surfaces of the ends of the yoke portions of the split core members corresponding to the overlapped portions.

According to the invention, the stator core is constituted by the plurality of split cores of which the adjacent ends come in contact with each other and the stator core is formed by rotating and stacking the plurality of laminates. With such a configuration, it is possible to achieve efficiency of the coil, increase a coil occupation ratio and allow the phase of the torque pulsation components, which occur due to deformation of the inner circumference shape of the stator core, such as the stepped portion between adjacent tooth portions and the magnetic anisotropy of the steel sheet as a base material in a punching for the stator core, to be different in every laminate. Accordingly, by allowing the phases in every laminate to have a predetermined relation by rotational stack, it is possible to offset the torque pulsation components in every laminate on the whole and reduce the torque pulsation components.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
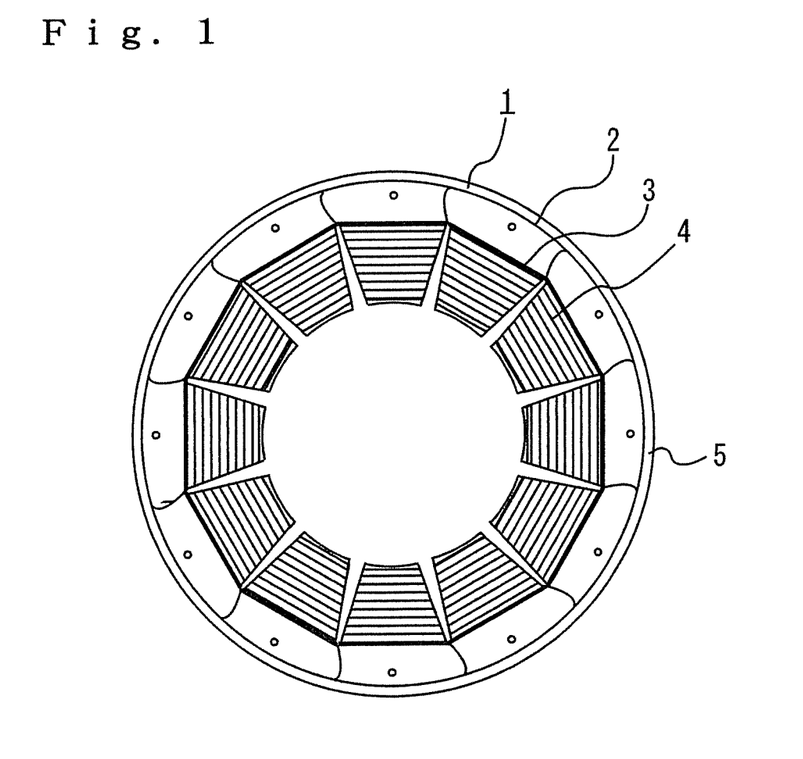
FIG. 1 is a plan view illustrating a stator formed by split cores of a rotating electric machine according to a first embodiment of the invention.

FIG. 1 is a plan view illustrating a stator formed by split cores of a rotating electric machine according to a first embodiment of the invention. FIG. 1 shows that twelve magnetic poles, but the invention is not limited thereto. In FIG. 1, Reference Numeral 1 denotes a stator core, Reference Numeral 2 denotes a split core, and a yoke portion split in respective twelve teeth and a tooth portion protruding from the yoke portion inward in a radial direction of the stator are shown. Reference Numeral 3 denotes a wound frame made of an insulation resin material and covering the tooth portion and a coil 4 is wound in the tooth portion through the wound frame. In the stator core 1, twelve wound split cores 2 are arranged in an annular shape and end portions thereof come in contact with each other in a circumferential direction. A frame 5 is mounted around the outline of the stator core 1.

Figure 2:
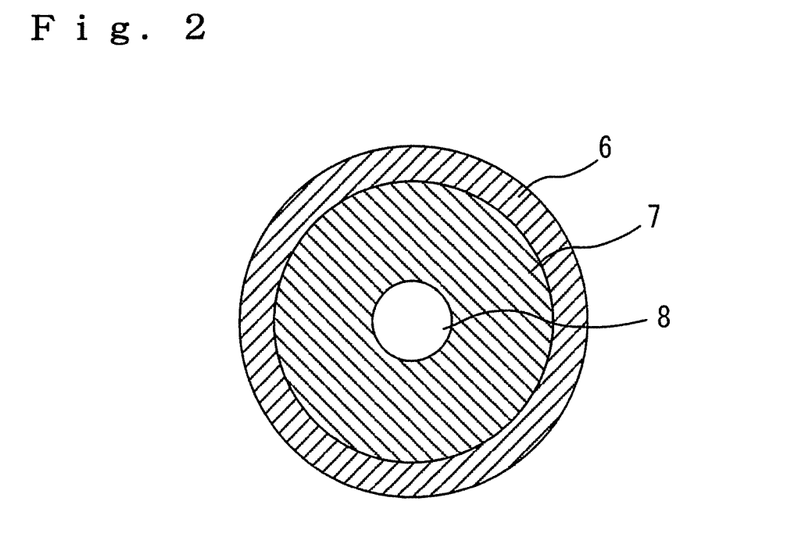
FIG. 2 is a sectional view illustrating a rotor to which a magnet is attached in the rotating electric machine according to the invention.

FIG. 2 is a sectional view illustrating a rotor to which a magnet is attached in the rotating electric machine according to the invention. As shown in FIG. 2, the rotor includes a ring-shaped magnet 6 which is provided around the outline of a rotor core 7 and a shaft 8 which is a rotational axis of the rotor at the center of the rotor core 7. The rotor core 7 has a structure in which steel sheets are stacked like the stator. The rotor is joined inside the stator shown in FIG. 1 to form the rotating electric machine.

Figure 3A:
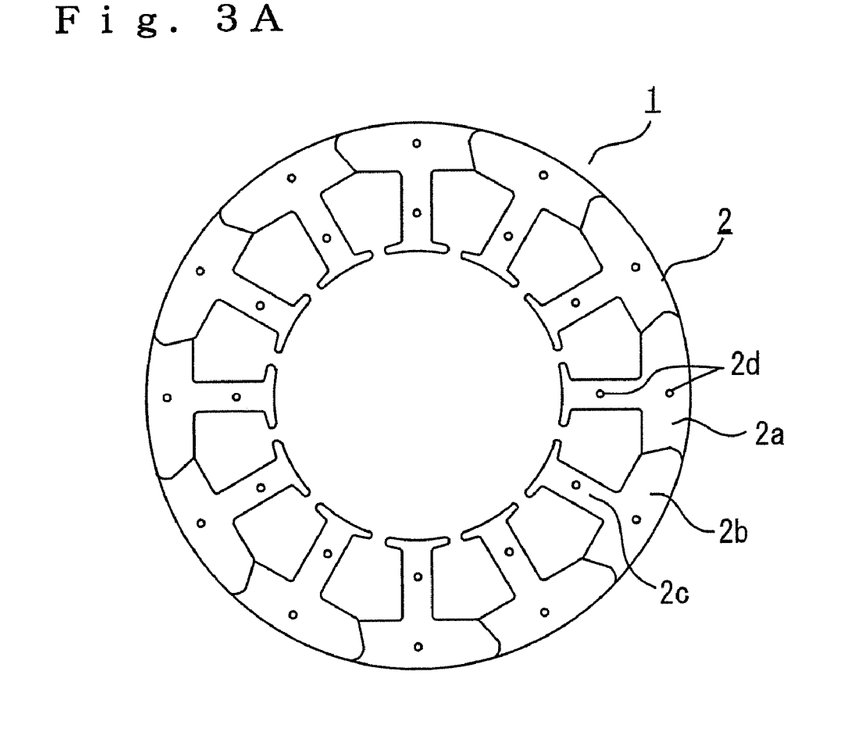
FIGS. 3A and 3B are a plan view and a side view illustrating a stator core included in the stator, respectively.
Figure 3B:
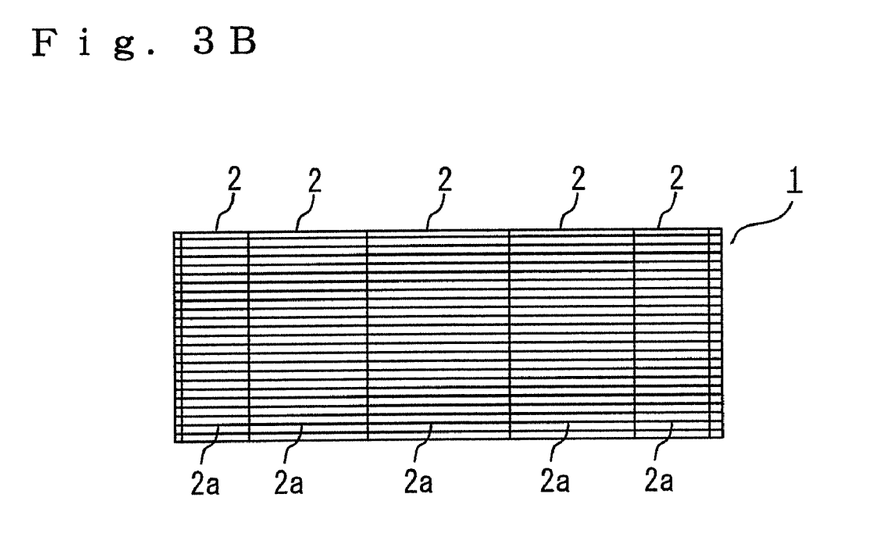

FIGS. 3A and 3B are a plan view and a side view illustrating the stator core included in the stator, respectively. As shown in FIGS. 3A and 3B, the split cores 2 are formed by stacking split core members 2a. In the split core member 2a, the shape of a first end, which is one end of the yoke portion in a circumferential direction, is different from the shape of a second end which is the other end of the yoke portion. A yoke portion 2b in which one end has a convex shape and the other end has a concave shape is given as an example of the yoke portion. The split core member 2a includes a magnetic pole tooth portion 2c protruding from the yoke portion 2b inward in the radial direction. Two concavo-convex portions 2d (which is called the concavo-convex portions since the front surface is concave and the rear surface is convex) which are formed for caulking and of which locations are different from each other in the radial direction are formed on the center front surface of the split core member 2a. The split core 2 is formed by stacking the split core members 2a and fixing the interlayer one another by the caulking concavo-convex portions 2d. On a side of a more protruding end, for example, a convex end between the first end and the second end of the yoke 2b of the split core member 2a, a concavo-convex portion 2e which is the same as the concavo-convex portion 2d is formed on the surface of the split core member 2a.

The stator core is formed by arranging the twelve split cores 2 in the annular shape and bringing the twelve split cores into contact with each other. Between the split cores 2, the first ends which are one ends of the yoke portions 2b in the circumferential direction come in contact with the second ends, which have the shape different from that of the first ends, of the yoke portions 2b of the split cores adjacent to the first ends. For example, the convex shape and the concave shape of the yoke portion 2b come in contact with each other. Hereinafter, the example in which the first and the second ends have the convex shape and the concave shape, respectively, will be described. Between the adjacent split core members 2a of the split cores 2, the convex ends of the yoke portions 2b in the contact portion are overlapped in a stack direction. The caulking concavo-convex portions 2e are formed in the overlapped portion in the stack direction in the same manner as that in the concavo-convex portions 2d, the split core members 2a adjacent to each other in the stack direction in the overlapped portion are connected to each other by caulking in the caulking concavo-convex portions 2e, and the coupling split core is formed. The split cores 2 adjacent in the circumferential direction are formed so as to rotate one another using the caulking concavo-convex portions 2e as an axis.

Figure 4A:
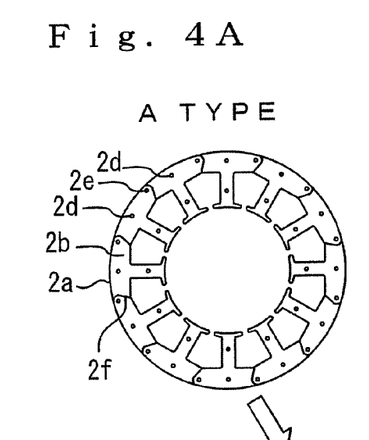
FIGS. 4A to 4C are plan views illustrating a method of manufacturing a coupling split core.
Figure 4B:
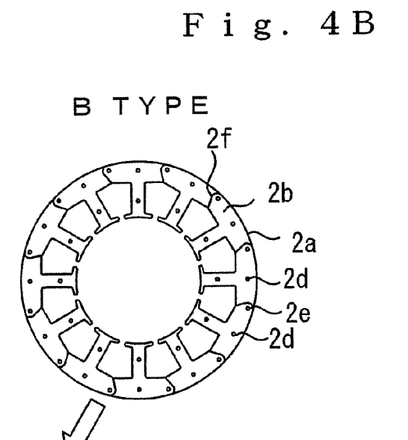
Figure 4C:
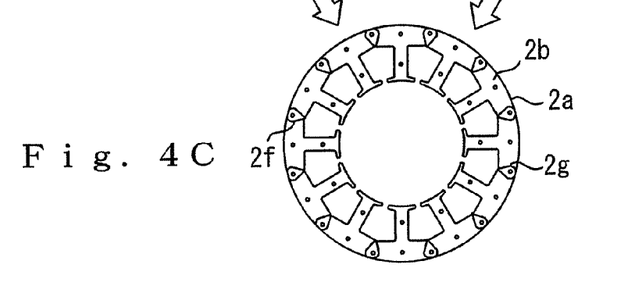
Figure 5:
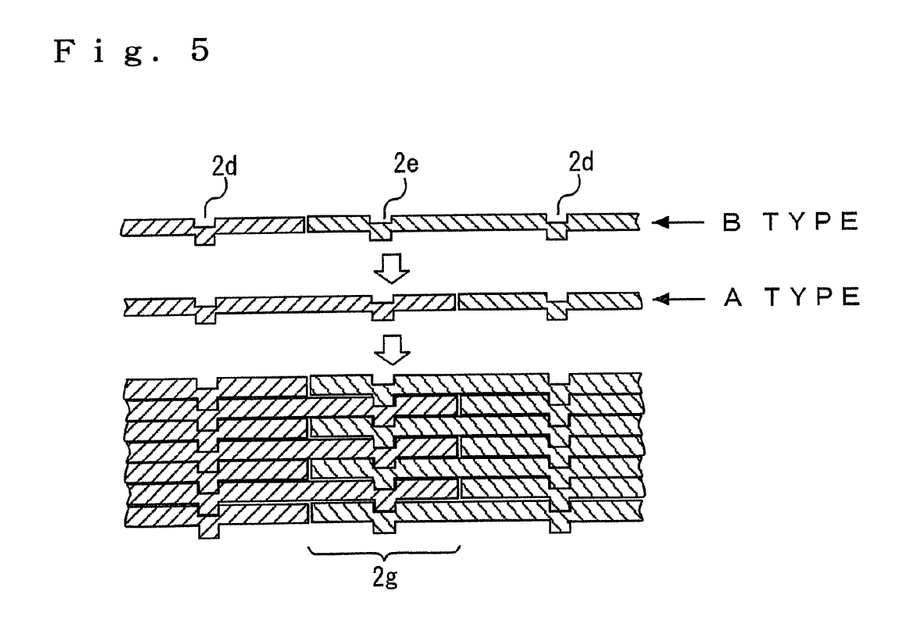
FIG. 5 is a sectional view illustrating the method of manufacturing the coupling split core.

FIGS. 4A to 4C are plan views illustrating a method of manufacturing the coupling split core and FIG. 5 is a sectional view illustrating the method of manufacturing the coupling split core. FIGS. 4A and 4B show two types of steel sheet layers used when the stator cores shown in FIGS. 3A and 3B are stacked. The steel sheet layer shown in FIG. 4A is referred to as an A type layer and the steel sheet layer shown in FIG. 4B is referred to as a B type layer. The A and B types are subjected to a press punching process to be formed in an annular shape, as the split core members 2a are shown, from thin steel sheets (hereinafter, abbreviated as steel sheets) formed of an electromagnetic steel sheet or a SPCE made of a magnetic material, and the punched arrangement of the steel sheets is held. In the yoke 2b of each split core member 2a formed of the A type layer, its clockwise front end has a convex shape in the circumferential direction and its counterclockwise end has a concave shape. On the other hand, in the B type layer, the both front ends in the yoke circumferential direction are conversely formed with respect to the ends of the yoke formed of the A type layer in the concave and convex shapes. In FIGS. 4A and 4B, all Reference Numerals 2d and 2e denote the concavo-convex portion described in FIGS. 3A and 3B.

FIG. 4C shows that both the types of steel sheets are alternatively stacked. In the A type layer and the B type layer, the split core members 2a are partitioned by cut portions called a cut line 2f. When both the types of steel sheets are stacked, portions 2g (hereinafter, referred to as "the overlapped portion") in which the convex ends are overlapped in the stack direction are formed.

FIG. 5 is the sectional view illustrating taken along the circumferential line passing the concavo-convex portions 2d and 2e, when the A type of steel sheet and the B type steel sheet are alternatively stacked. The sectional view is illustrated on the assumption that locations of the concavo-convex portions 2d and 2e in radial direction from the center of rotor rotation are equal to each other, but the invention is not limited thereto. The sectional view shows the overlapped portion 2g. As shown in the figure and as described in FIG. 3, the convex portions of the split core members 2a adjacent to each other in the stack direction in the split cores 2 are overlapped. The cylindrical concavo-convex portions 2e in the center of the overlapped portion 2g in the circumferential direction are formed by a deformation processing in a press process. The split cores 2 adjacent to each other in the circumferential direction can mutually rotate about the concavo-convex portions 2e, since the concavo-convex portions 2e are fitted with each other with small gaps (having about 5 µm) formed between the split core members 2a adjacent to each other in the stack direction. Each of the split cores 2 has the caulking concavo-convex portion 2d used for stack fixation and is caulked by pressing the caulking concavo-convex portion 2d, so that the split cores 2 as one laminate are fixed. A fitting margin of the caulking concavo-convex portion 2d is about 5 µm, and irregularity of elastic deformation and plastic deformation caused by the caulking and biased abrasion of a tool used to form the concavo-convex portion affect a little on a shape accuracy of the split core 2. Accordingly, the coupling split core is more excellent in a reproducible property than a non-coupling split core upon reproducing the split core in the annular shape.

Figure 6:
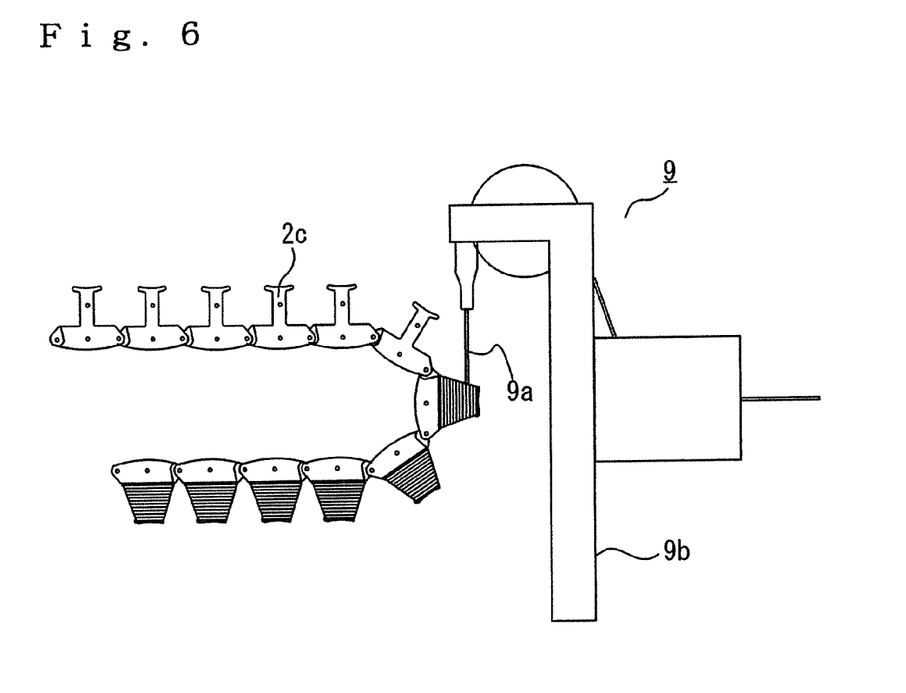
FIG. 6 is a plan view illustrating that the coupling split core is wound.

FIG. 6 is a plan view illustrating that the coupling split core is wound. In FIG. 6, when a head 9b of a winding machine 9 is rotated, a wire 9a which becomes a coil is wounded about the magnetic pole tooth portion 2c of each split core 2. Since the magnetic pole tooth portion 2c of each split core 2 is rotatably connected to the adjacent magnetic pole tooth portions 2c, an angle between the magnetic pole tooth portion 2c and the adjacent magnetic pole tooth portion 2c can be expanded upon wining the coil. Since the magnetic pole tooth portion 2c of each split core 2 can be deformed toward the outside, a sufficient space for supplying the wire 9a can be secured. Therefore, in the sufficiently secured space, the magnetic pole tooth portion 2c can be wound without interference of the adjacent split cores 2 in a state where a straight property of the wire 9a supplied from the winding machine 9 is maintained. Accordingly, since it is possible to perform the wiring in a state where the wire 9a is wound in alignment for the magnetic pole tooth portion, a coil occupation ratio can be increased. Moreover, since the sufficient space for the wiring is secured, the wiring can be performed in a circular orbit in which a high speed motion is possible, thereby achieving high productivity.

Moreover, it is easy to carry forward winding process to the adjacent tooth portions as the split cores are coupled to each other. For example, the coupling split core can effectively be wound even in a small space, when the magnetic pole tooth portion is deformed to the outside to wind the wire on a rotatable cylindrical structure, the cylindrical structure is rotated upon completing the winding on every magnetic pole tooth portion, and the subsequent magnetic pole tooth portion is moved to the location of the winding machine. Of course, the coupling split core may be arranged in the shape of a racetrack, as shown in FIG. 6. In this case, even though a wider space is necessary, an opened angle between the magnetic pole tooth portion and the adjacent magnetic pole tooth portions located in the location of the winding machine can be made larger, compared to the case where the wire is wound around the cylinder. Therefore, it is more preferable in that the interference of the adjacent magnetic pole tooth portions can be reduced. Even in this arrangement, the wire can effectively be wound around the coupling split core likewise in consideration of a transport mechanism of the coupling split core. Moreover, the shape reproducible property of the coupling split cores upon assembling the coupling split cores in annular shape is improved more than that of the non-coupling split cores thanks to high processing accuracy of the caulking concavo-convex portions 2e.

Figure 7:
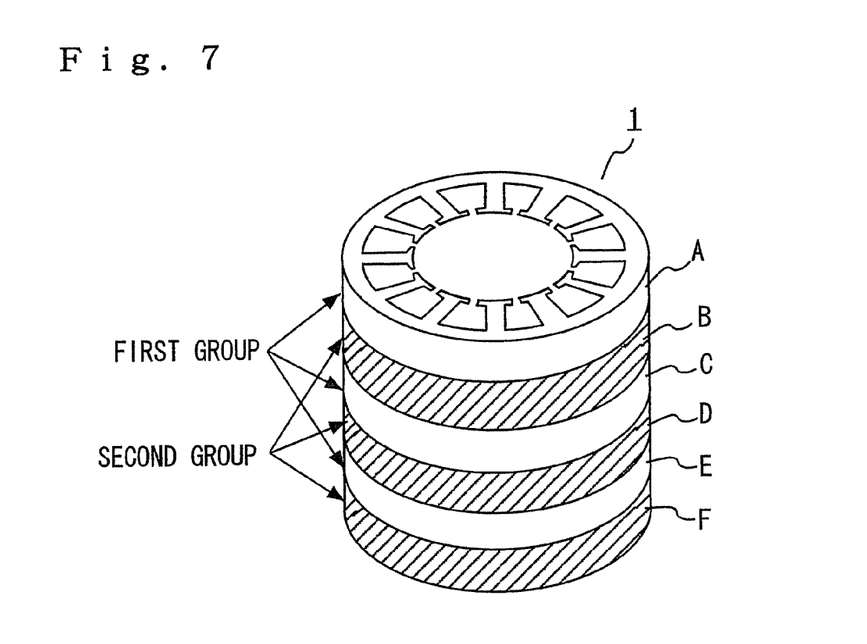
FIG. 7 is a schematic perspective view illustrating the stator core including the coupling split cores of the rotating electric machine according to the invention.

FIG. 7 is a schematic perspective view illustrating the stator core including the coupling split cores 2 of the rotating electric machine according to the invention. Each of laminate portions of A, B, C, D, E, and F shown in FIG. 7 is a part of the stator core including the split cores 2 formed by the stack in the processes described above in FIGS. 4 and 5, the stack thickness of the laminate portions is thinner than a completed stator core. Hereinafter, the respective laminate portions are referred to as laminates A, B, C, D, E, and F for convenient description. Rolling directions of respective layers included in the laminates are equal to each other, since the split core members 2a punched from each one steel sheet are stacked in a state where the punched location relation is just maintained without change. The laminates have a stepped portion of magnetic portions at an equal location, when a distance difference is present between a specific magnetic pole end and an adjacent magnetic pole end in view from a rotor rotational center due to a partial error in the punch mold upon assembling the laminates in an annular shape. When an arrangement relation between a punch processing machine and the steel sheet as a processing target is common, the arrangement of the stepped portion and the rolling direction are common for the respective laminates. Therefore, as long as the laminates are prepared by the same machine and from the same steel sheet, the laminates are equally formed by setting a predetermined direction X and using the direction X as the same direction. An error caused upon assembling the coupling split cores 2 in the annular shape can be made small. However, as described below, it is not sufficient in terms of reduction in the torque pulsation component and it is necessary to take a shape error of the stepped portion or the like into consideration.

In this example, the laminates are classified into two groups. The laminates A, C, and E are classified as a first group and the laminates B, D, and F are classified as a second group. The relation between the punch mold used to prepare the laminates and the rolling direction of the steel sheet is common for the laminates. Therefore, the respective laminates are equal to each other, except for the thicknesses of the respective laminates. The direction X is divided into a direction X1 and a direction X2 for the laminates of the first group and the laminates of the second group, respectively, which have a predetermined angle. A stacking method in which laminates are classified into a plurality of groups and the directions X of the respective groups do not accord with each other and have a predetermined angle is called a rotational stack. By preparing the stator core by the rotational stack, it is possible to reduce a torque pulsation component of the rotating electric machine which is caused by the shape asymmetry of the stator core, which will be described below. In addition, the number of groups constituting the laminates may be one.

Occurrence of the torque pulsation of the rotating electric machine will be described. The torque pulsation occurs due to various causes. In general, the torque pulsation is mainly caused by a stator and secondarily caused by a rotor. For example, an error in the inner circumferential shape of the stator, irregular distribution of stress caused by welding, shape asymmetry, and magnetic asymmetry of the stator caused by magnetic anisotropy or the like are dominant causes for the occurrence of the torque pulsation. When these causes are present, unbalance occurs in a magnetic property in a circumferential direction, that is, permeance which is the reciprocal of magnetoresistance. Therefore, magnetic energy generated from an air gap between the respective magnetic poles of the stator and the rotor varies in accordance with location of the circumferential direction, namely, the rotor rotational angle. For that reason, the torque pulsation occurs in either electricity application or non-electricity application, when the rotor is rotated. The torque pulsation occurring in non-electricity application is called cogging torque. The torque pulsation occurring in electricity application is called torque ripple. Torque variation in the circumferential direction caused by the magnetic asymmetry of the stator is pulsed at the same period as the number p of magnet poles along with the rotation of the rotor.

A torque pulsation component, having a period, can be represented on the complex plane by a vector. On the assumption that torque generated when the rotor is located at a rotational angle $\theta$ from a predetermined reference of the stator is $T(\theta)$, an expression including a phase is:

$$T(\theta)=|T|\cdot\exp(j\theta) \quad (1),$$

where $|T|$ is an absolute value of the torque $T(\theta)$ and j is an imaginary unit. The expression is replaced by a vector in a polar coordinate space and expressed as a torque vector T corresponding to $T(\theta)$ as follows:

$$T = (Tx, Ty), \quad (2)$$

$$|T| = (Tx^2 + Ty^2)^{1/2}, \quad (3)$$

$$T_x = \frac{k\mu_0 F^2}{2} \int_0^{2\pi/p} A_0(\phi, \theta)\cos(p\phi)d\phi, \quad (4)$$

$$T_y = \frac{k\mu_0 F^2}{2} \int_0^{2\pi/p} A_0(\phi, \theta)\sin(p\phi)d\phi, \text{ and} \quad (5)$$

$$A_0(\phi, \theta) = \sum_{n=1}^{p} \frac{\partial}{\partial \theta}\{1/g_n(\phi, \theta)\}^2 \quad (6)$$

where $g(\phi, \theta)$ is a length of an air gap at a location of an angle $\phi$ on the assumption that a rotational angle $\theta$ is a reference angle, F is a magnetomotive force and is generally proportional to the stack thickness of the stator core, $\mu_0$ is a magnetic permeability of vacuum, k is a value obtained by dividing a volume of the air gap at a minute angle $d\phi$ by $d\phi$ and is proportional to the stack thickness of the stator core, and p is the number of magnetic poles of the rotor.

The phase angle of the toque vector T can be obtained from Tx and Ty. Torque interacts with a magnet force. Therefore, since the magnet force has a period of the number of magnets with respect to one circle (one circle as a machine angle) of the rotor, the torque also has a period by the number of magnets (which is a period of a magnetic pole angle). Accordingly, by preparing the plurality of laminates having the torque vector vibrated at a period of the magnetic pole angle and performing a so-called rotational stack in which the laminates are stacked by mutually rotating the laminates at a predetermined angle, it is possible to reduce the torque pulsation caused by the shape, magnetic characteristics such as magnetic anisotropy of a steel sheet, magnetic asymmetry caused by stress distribution in the stator core in the whole of the stator core.

An offset condition of the torque vector by the rotational stack is expressed as the below expression. The magnetic pole angle is expressed as a product of the number of magnetic poles of the rotor and the rotational angle (the machine angle described above).

$$T = \sum_{i=1}^{n} |Ti|\cdot\exp(j\alpha i\cdot p) = 0 \quad (7)$$

where i is a group number of a laminate, p is the number of magnetic poles of the rotor, $|Ti|$ is the magnitude of a torque vector of a laminate belonging to an i group and can be obtained by Expressions (3) to (5) described above, and $\alpha i$ is a rotational angle of the laminate belonging to the i group.

When the split core members $2a$ forming each laminate are punched from the steel sheets having equal characteristics using the punch mold, $|Ti|$ is proportional to the total sum of the stack thickness of the laminates belonging to the i group. Accordingly, on the assumption that the total sum of the stack thickness of the laminates belonging to the i group is hi, Expression (7) is transformed into the below expression.

$$T = \sum_{i=1}^{n} hi\cdot\exp(j\alpha i\cdot p) = 0 \quad (8)$$

Figure 8:
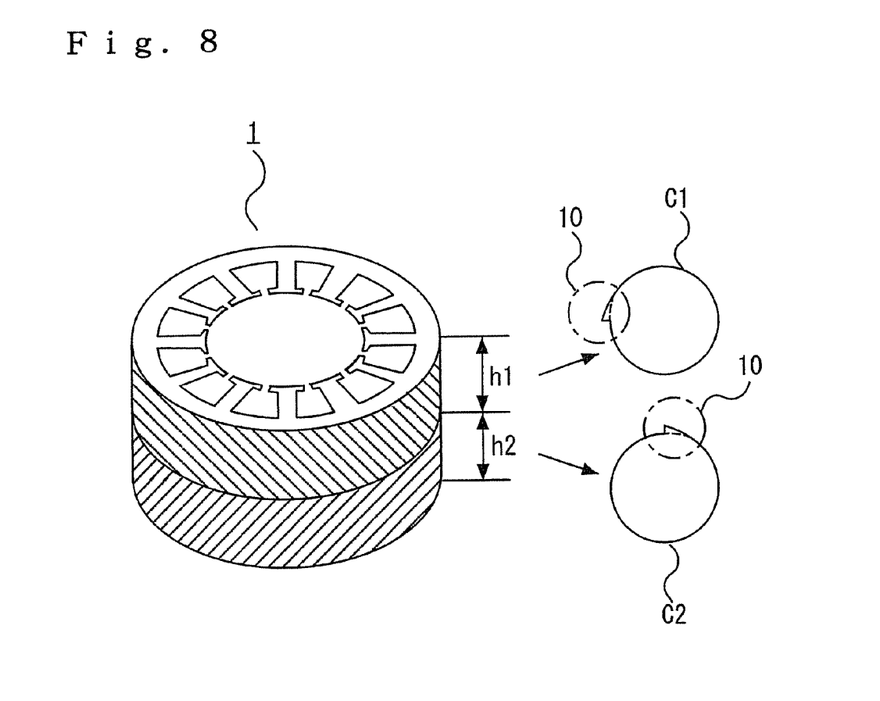
FIG. 8 is a schematic diagram illustrating a stator core formed by rotating and stacking two laminates in which a first group and a second group each consisting of one laminate and a stepped portion in one portion of the inner circumferential shape.

FIG. 8 shows an example in which the laminates consist of two groups and sums of the thicknesses of the laminates belonging to the respective groups are h1 and h2. In this example, as shown in the right figure of FIG. 8, a stepped portion 10 as a cause of the magnetic asymmetry of the stator is present between end portions of front ends of the adjacent magnetic pole tooth portions. In FIG. 8, portions deviated from circles C1 and C2 inscribed to the front ends of the magnetic pole tooth portion are shown as the stepped portions 10.

When the sum of the stack thicknesses of the laminates belonging to the i group are equal to each other, Expression (8) is transformed into the below expression.

$$T = \sum_{i=1}^{n} \exp(j\alpha i\cdot p) = 0 \quad (9)$$

On the assumption that the number of laminates belonging to each group is one and an angle between a first layer and a second layer is $\alpha$ in a case of h1=h2 in FIG. 8 or on the assumption that the sums of the stack thicknesses of a first group and a second group are equal to each other and rotational angles of the first group and the second group with respect to a predetermined reference location are $\alpha 1$ and $\alpha 2$ in FIG. 7, expressions for a real part and an imaginary part are expressed using Expression (9) as follows:

$$\cos(\alpha 1\cdot p)+\cos(\alpha 2\cdot p)=0 \quad (10) \text{ and}$$

$$\sin(\alpha 1\cdot p)+\sin(\alpha 2\cdot p)=0 \quad (11).$$

When a condition of $(\alpha 2-\alpha 1)\cdot p=\pi+2\pi\cdot k$ (where k is an integer number) is satisfied from the above expressions, the first group and the second group become an inverse phase.

Figure 9A:
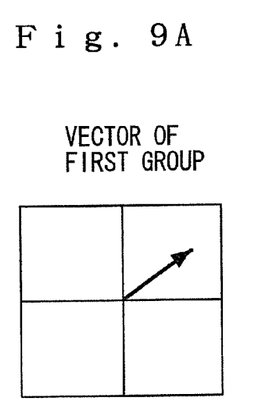
FIGS. 9A, 9B, and 9C are diagrams illustrating a vector of the torque pulsation in which torque pulsation components by the shape are inverse phases one another in the first group and the second group and have an equal magnitude.
Figure 9B:
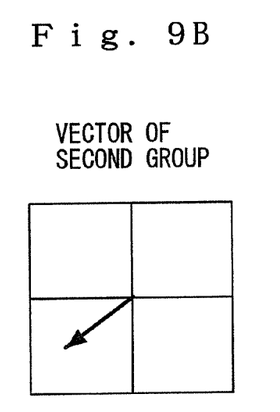
Figure 9C:
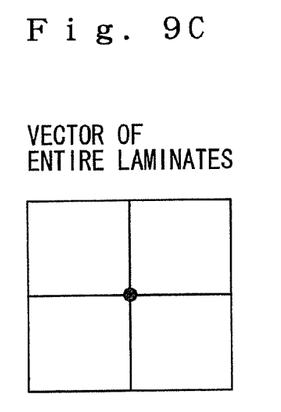

FIGS. 9A, 9B, and 9C are diagrams illustrating a vector of the torque pulsation in the example in which torque pulsation components by the shape are inverse phases one another in the first group and the second group and have an equal magnitude. For example, when p is 10, $\alpha 2-\alpha 1$ is set to $\alpha$. When $\pi/2$ is selected as $\alpha$, an equation $\alpha\cdot p=5\pi=\pi+2\pi\times 2$. When k=2, it can be known that Expression (9) is satisfied. Accordingly, the vectors have the inverse phase in the first group and the second group. Moreover, when the stack thicknesses of the first group and the second group are made equal, the magnitudes of the vectors become equal. When set in this way, a resultant vector becomes zero. Therefore, when a common torque pulsation component caused by the shape of the respective laminates, the magnetic anisotropy of the steel sheet, or the like, it is possible to reduce the torque pulsation component caused by these causes by the rotational stack.

When the rotational angle $\alpha i$ is set in a normal design, a restriction that slot locations are matched with each other between the groups of the laminates is added. When the restriction is not added, the locations of magnetic poles are crossed in every laminate and thus a problem with the coil in the magnetic pole tooth portion may occur. For that reason, the rotational angle $\alpha i$ in the stator having s number of slots is restricted to a value taken from the below expression:

$$\alpha i = 2\pi \cdot t/s \text{ (where } t \text{ is an integer in } 0 \leq t \leq s-1) \tag{12}$$

When the rotational angle $\alpha i$ is transformed into a magnetic pole angle $\alpha i'$ in use of the rotor with p number of magnetic poles, the below expression is obtained.

$$\alpha i' = \alpha i \cdot p = 2\pi \cdot t \cdot p/s \text{ (where } t \text{ is an integer in } 0 \leq t \leq s-1) \tag{13}$$

For example, when the laminates consisting of a plurality of groups are all equal and the rotating electric machine with eight poles and twelve slots and the rotating electric machine with ten poles and twelve slots are used, the magnetic pole angle $\alpha i'$ set for the i group is transformed into Expressions (14) and (15) from Expressions (12) and (13), respectively, as follows.

$$\alpha i' = (4\pi/3) \times t \text{ (where } t \text{ is an integer in } 0 \leq t \leq 11) \tag{14}$$

and $$\alpha i' = (5\pi/3) \times t \text{ (where } t \text{ is an integer in } 0 \leq t \leq 11) \tag{15}$$

Figure 10A:
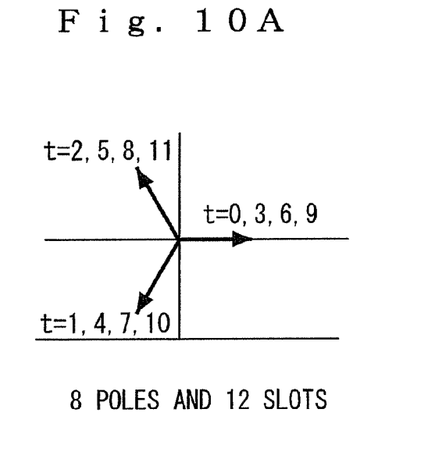
FIG. 10A is a diagram illustrating a direction of a torque vector allowed when slot locations are matched in a case of eight poles and twelve slots.
Figure 10B:
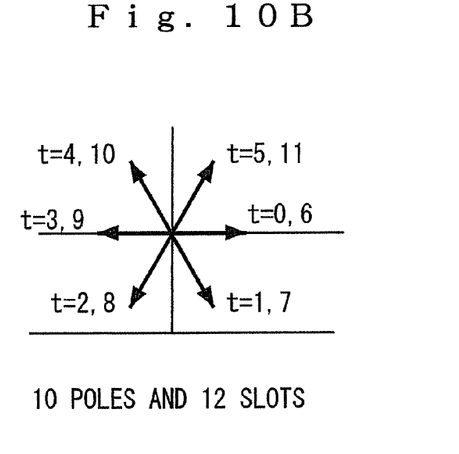
FIG. 10B is a diagram illustrating a direction of a torque vector allowed when slot locations are matched in a case of ten poles and twelve slots.

FIG. 10A is a diagram illustrating the torque vector having a phase corresponding to the magnetic pole angle obtained from Expression (14) allowed in the case of eight poles and twelve slots. FIG. 10B is a diagram illustrating the torque vector having a phase corresponding to the magnetic pole angle obtained from Expression (15) allowed in the case of ten poles and twelve slots.

In an example of the two laminates in eight poles and twelve slots, the magnetic pole angles obtained from Expressions (10) and (11) are 0 and $\pi$. On the other hand, the magnetic pole angles allowed from Expression (14) are 0, $2\pi/3$, $4\pi/3$, and integer multiple thereof by $2\pi$. Since $\pi$ is not contained in the above magnetic pole angles, it is concluded that in the case of eight poles and twelve slots, the torque pulsation is not offset in the rotational stack of the two laminates.

Next, in an example of the two laminates in ten poles and twelve slots, the magnetic pole angles obtained from Expressions (10) and (11) are equally 0 and $\pi$. On the other hand, the magnetic pole angles allowed from Expression (15) are 0, $\pi/3$, $2\pi/3$, $\pi$, $4\pi/3$, $5\pi/3$, and integer multiple thereof by $2\pi$. Since 0 and $\pi$ are contained in the above magnetic pole angles, it is concluded that in the case of ten poles and twelve slots, the torque pulsation can be offset in the rotational stack of the two laminates. Since a phase relation of the two laminates related to the offset is relative, the magnetic pole angles satisfying Expression (9) may be separate one another by $\pi$. Accordingly, $\pi/3$ and $4\pi/3$, $2\pi/3$ and $5\pi/3$ may be combined as well as the combination of 0 and $\pi$. The rotational angle of the other laminate with respect to one laminate may be $\pi/10$.

An electric motor such as a power steering having a high practical use may have twelve stator slots and ten rotor poles or twelve stator slots and eight rotor poles, since the electric motor has a high torque characteristic and is suitable for miniaturization. Such an electric motor needs to reduce the torque pulsation.

First, when the stator core is formed with two laminates having an equal stack thickness in the electric motor having twelve stator slots and ten rotor poles, the rotational angle between the laminates is calculated as $\pi/2$ by the above-described method.

When the stator core is formed with three laminates having an equal stack thickness in the electric motor having twelve stator slots and eight rotor poles, the rotational angles of the other laminates with respect to one laminate are calculated as $\pi/6$ and $\pi/3$ by the above-described method.

With this method, the minimum rotational angle in the rotational stack is selected. In the rotational stack, the laminates formed by cutting and stacking by the mold, as described above, are continuously cut and stacked by rotating the laminates by the rotational angles. Accordingly, an advantage of improving productivity is obtained, since the minimum rotational angle means that time necessary for rotation is made shorter. In these examples, the two laminates and the three laminates have been described, but the laminates may be stacked as a plurality of groups shown in FIG. 7 by repeatedly stacking the two or three laminates having the angle relation selected above. When the number of laminates forming the groups increases, the time necessary for the rotation also increases. Therefore, an advantage of shortening the time like the above examples is obtained. That is, the productivity is further improved.

When the slot locations of the laminates are not matched, the restriction of Expressions (12) and (13) are not necessary. As an example of such a case, a coil is wound on every laminate, the respective laminates are rotated in accordance with the rotational stack, and the laminates are integrally formed. In this case, the same advantages described above can be obtained.

Figure 11:
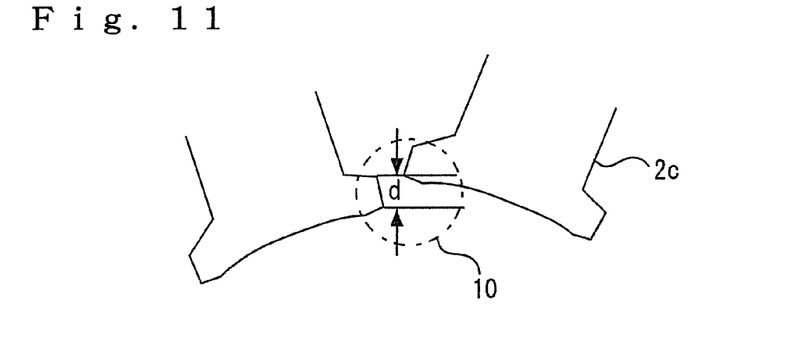
FIG. 11 is a diagram illustrating a stepped portion between adjacent ends of front ends of magnetic pole tooth portions.
Figure 12:
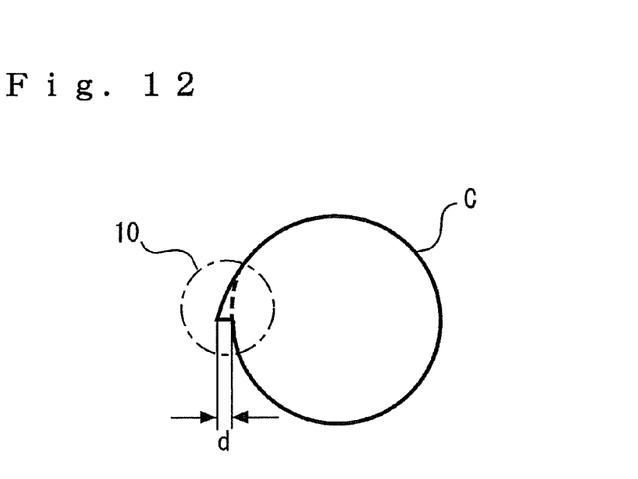
FIG. 12 is a diagram illustrating a case where the stepped portion between the adjacent ends of the front ends of the magnetic pole tooth portions exists at a predetermined location of an inner circumference of the stator.
Figure 13:
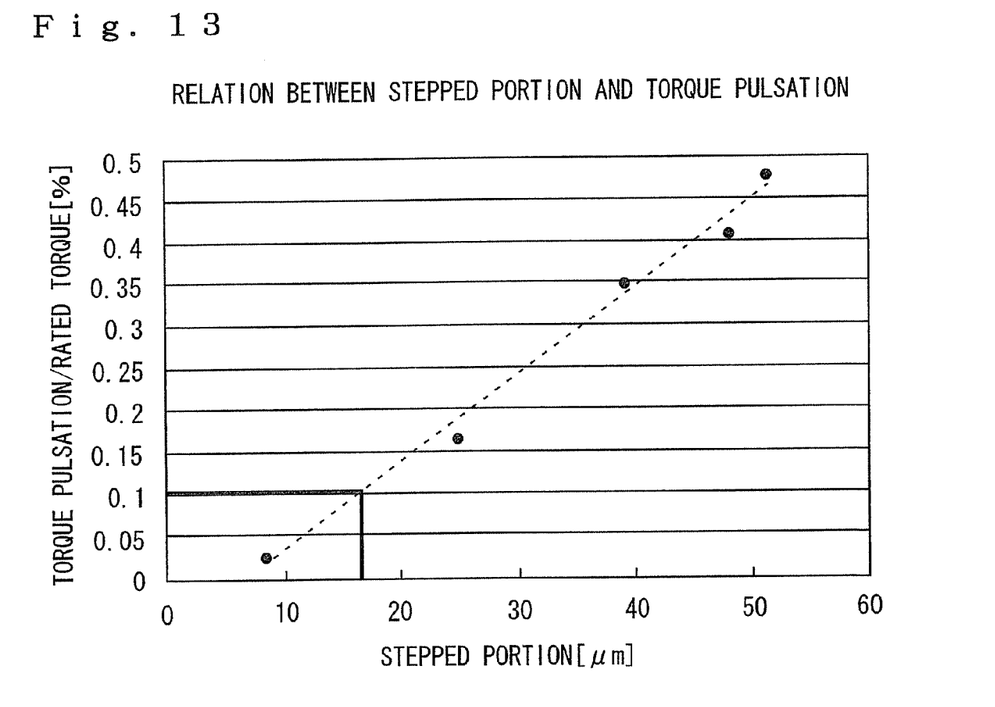
FIG. 13 is a diagram illustrating a relation between the stepped portion and the torque pulsation.

In recent years, a demand for reducing the torque pulsation was increased in order to improve positioning accuracy or reduce vibration or noise. Quantitatively, reducing the torque pulsation by 0.1% of a rated torque was demanded. In the split cores, as shown in FIG. 11, the stepped portion easily occurs in the adjacent front ends of the magnetic pole tooth portions. Therefore, the stepped portion may cause deterioration in the torque pulsation. For example, when the stepped portion occurs in one portion of an inscribed circle C in the front end of the magnetic pole tooth portion, as shown in FIG. 12, measurement results of a relation between the size of the stepped portion and the magnitude of the torque pulsation are shown in FIG. 13. A neodymium magnet was used in the rotor and a small standard motor in which an air gap between a stator and a rotor is a 0.6 mm, an outer diameter of the stator is 80 mm, and a stack height is 40 mm was used. The torque pulsation is proportional to the size of the stepped portion. In order to reduce the torque pulsation by 0.1%, the stepped portion has to be suppressed to 17 µm or less. In an integrated core which is not divided, the stepped portion is determined by mold accuracy. Since the mold accuracy is 10 µm or less, a problem that the torque pulsation is deteriorated to 0.1% or more does not occur. In the split cores, the stepped portion easily occurs since assembly accuracy is about 30 µm. Therefore, it is difficult to suppress the torque pulsation to 0.1% or less. The invention is a technique capable of allowing the stepped portion, which rarely occurs in the integrated core, in the core having an error of the inner circumference shape by 10 µm or more and capable of reducing the torque pulsation.

It is ideal that the magnitude of the resultant torque vector by the rotational stack is zero, but in many cases, it is difficult to make the resultant torque zero due to various situations. Even in these cases, some advantage may be obtained in practical use, when the result torque vector is made smaller than the maximum magnitude of the torque vector of the respective laminates. The reference is as follows.

Rotational angles $\alpha i$ (where i=1 to n) are set as described below on the assumption that the number of poles of the rotor is p, the magnitude of the torque pulsation components of the i-th laminate is |Ti|, and the maximum value of Ti is MAX(Ti) (where i=1 to n).

$$\sum_{i=1}^{n} |Ti| \cdot \exp(j\alpha i \cdot p)$$

That is, rotational angles αi are set so that the magnitude of the resultant torque pulsation components defined by the above expression may be smaller than MAX (Ti). The torque vectors of Ti corresponding to hi can be all calculated by Expressions (2), (4), and (5). Accordingly, hi and αi satisfying the above reference can be obtained.

When the causes of the torque pulsation of the respective laminates are common, it is considered that the toque pulsation component caused by magnetic asymmetry (hereinafter, abbreviated as "the magnetic asymmetry caused by a shape") occurring by at least one of magnetic characteristics such as the shape of respective laminates and magnetic anisotropy of a steel sheet is proportional to the thickness of the laminates. Therefore, |Ti| may be replaced by hi and hi and αi satisfying the above reference can be obtained more simply.

Second Embodiment

Figure 14A:
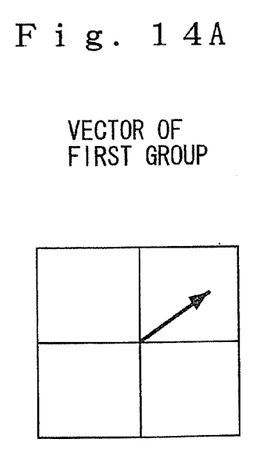
FIGS. 14A, 14B, and 14C are diagrams illustrating an example in which the torque pulsation components are offset by stress.
Figure 14B:
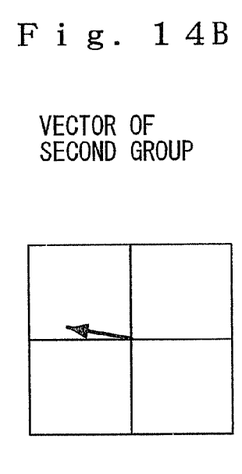

A second embodiment describes that the torque pulsation component caused by the magnetic asymmetry occurring by a shape or the like and the torque pulsation components caused by the stress offset one another, as shown in FIG. 14. FIGS. 14A and 14B show that the magnitudes and phases of the torque vectors can be set by grasping the torque pulsation components as vectors and varying the stack thicknesses of the first group and the second group and the rotational angles of the laminates forming the respective groups in an arbitrarily set reference direction.

Accordingly, the resultant torque vector obtained by combining the first group and the second group and associated with the rotational stack can also be set in an arbitrary manner.

On the other hand, in the stator core formed by stacking the laminates of the first and second groups collectively and integrally, the outer circumference is contracted and inserted in a frame to be fixed. In this case, tightening stress is added to the respective laminates due to the frame. However, the tightening stress is uniform in the stack direction, but is distributed asymmetrically in a circumferential direction of the stator core in many cases. Therefore, the torque pulsation component (that is, the torque vector) occurs due to the asymmetry. The asymmetry in the tightening stress of the frame is common for the laminates even though the respective laminates are rotated in any direction and stacked. Therefore, the phase of the torque vector caused by the asymmetry of the tightening stress does not depend on the rotation in stack of the laminates. That is, the magnitude and phase of the torque vector by stress of the stator core tightened by the frame and fixed in an annular shape are fixed. On the other hand, in the stator core formed by the laminates of the two groups shown in this example, as described above, the resultant torque vector associated with the rotational stack can be arbitrarily set.

Figure 14C:
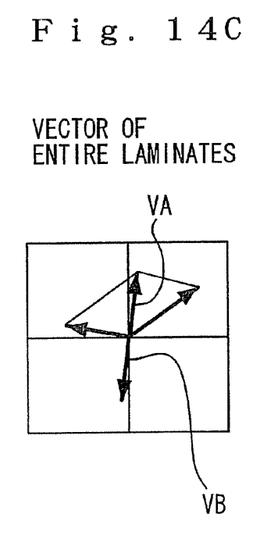

In this way, as shown in FIG. 14C, it is possible to offset both the torque vectors, that is, the torque pulsation components by setting the sum of the thicknesses of the laminates belonging to the respective groups and the mutual rotational angle of both the groups so that the magnitude of a resultant torque vector VA (hereinafter, abbreviated as "the resultant vector by a cause such as a shape) obtained in combination of the torque vectors of the two groups of the laminates by the shape asymmetry is made equal to the magnitude of a torque vector VB by the stress and the phase of the resultant torque vector VA and the phase of the torque vector VB by the stress are inverse one another.

The sums of the thicknesses of the laminates belonging to the respective groups is different from each other in FIGS. 14A, 14B, and 14C, but may be equal to each other. When the stack thicknesses of the plurality of laminates are substantially equal to each other, the magnitudes of the torque pulsation components by the shape asymmetry in every laminates become equal to each other. Accordingly, an advantage of simply offsetting the torque pulsation components only in consideration of the rotational angle can be obtained.

The torque vector by the stress can be obtained by experimentally using a model object processed without the shape asymmetry.

It is ideal that the magnitude of the resultant torque vector, to which the magnitude of the resultant torque vector by the shape and the magnitude of the resultant torque vector by the stress are combined, are zero, but in many cases, it is difficult to make the resultant torque vector zero in various situations. Even in these cases, some advantage may be obtained in practical use, when the result torque vector having the maximum magnitude by the shape asymmetry in the respective laminates is made smaller than one having larger value between the torque vector of the laminates having the maximum stack thickness and the torque vector caused by the asymmetric property of stress.

Rotational angles αi (where i=1 to n) are determined as described below on the assumption that the number of poles of the rotor is p, the thickness of the i-th laminate is hi, the magnitude of the torque vector of the i-th laminate is |Ti|, and the maximum value of |Ti| is MAX(Ti) (where i=1 to n).

$$\sum_{i=1}^{n} |Ti| \cdot \exp(j\alpha i \cdot p) \tag{16}$$

That is, rotational angles αi are determined so that the magnitude of the resultant torque vector defined by the above expression may be smaller than one having a larger value between MAX(Ti) and the magnitude of the torque vector caused by the asymmetric property of stress.

Here, as the torque pulsation components, the torque pulsation components by the inner circumferential shape and the stress have been described, but the torque pulsation components caused by the asymmetric property of the stator core may be combined likewise to be reduced. For example, a component by the asymmetric property of a shape or a component by magnetic anisotropy of the steel sheet is exemplified in addition to the components by the inner circumference shape or the stress.

In this embodiment, the laminates are classified into two types of the first group and the second group, but the vector combination is possible by three or more types of groups. In this case, the thicknesses of the respective groups and the magnitude and phase of the resultant vector by the rotational angle between the groups can be arbitrarily set likewise with the case of the two groups. In addition, the respective groups are formed by the plurality of laminates, but a group formed by one laminate may be used together. Even in this case, the advantages described above can be obtained. This embodiment is also applied to the first embodiment.

Third Embodiment

In this embodiment, another configuration of the coupling split core will be described. In the split cores described in the first embodiment of the invention, the ends of the split core members include the overlapped portion 2g in the stack direction and the adjacent split cores are alternatively and rotatably connected by stacking the concavo-convex portions 2e formed in the overlapped portion 2g. In this embodiment, the cut lines 2f shown in FIG. 4 are not completely cut when the yokes 2b of the adjacent split core members 2a are punched, but non-cut portions remains in parts thereof in the outermost circumference. Both the ends of the yoke 2b may not have different shapes like the concave and convex shapes shown in FIG. 4, but may have an equal shape. Accordingly, when the ends of the yoke 2b have the equal shape, the two A and B types described in the first embodiment are not necessary for the stacking. A rotational stack is the same as that described in the first embodiment. In the split cores formed in this manner, the adjacent split cores are connected to each other in the non-cut portions. Therefore, when the width of the non-cut portions in a radial direction is small, the adjacent split cores can rotate one another about the non-cut portions. Accordingly, in this embodiment of the invention, the same advantages as those described in the first embodiment are obtained.

According to the invention, the rotating electric machine is effectively used as a driving motor used in a machine tool, an electrically-driven power steering of a passenger car, an elevator, etc.

Various modifications and alternations of this invention will be apparent to those skilled in the art without departing form the scope and spirit of this invention, and it should be understood that this is not limited to the illustrative embodiments set forth herein.

What is claimed is:

1. A method of manufacturing a rotating electric machine in which a rotor is formed by fixing a rotor core having p number of magnetic poles around a shaft which is a rotational axis, m number of split cores are formed by stacking a plurality of split core members which each include a yoke portion and a magnetic pole tooth portion protruding from the yoke portion inward in a radial direction, a stator core is formed by rotatably connecting ends of the split cores adjacent to each other upon arranging the m number of split cores in an annular shape, and a stator is formed by winding a coil around the respective split cores included in the stator core, and the stator is disposed in an annular shape around an outer circumference of the rotor, the method comprising:

punching from a steel sheet in an annularly arranged shape the m number of split core members A each of which include the yoke portion including a first end on one end side in a circumferential direction, a second end having a shape different from the shape of the first end to complement the first end on the other end side in the circumferential direction and a caulking concavo-convex portion on a surface of the first end, and the magnetic pole tooth portion protruding from the yoke portion inward in a radial direction;

forming the split core members B in which locations of a first end and a second end in a circumferential direction are reverse to those in the split core members A by the same punching as that in the split core members A, and forming the m number of split cores by alternatively stacking the split core members A and the split core members B by a predetermined thickness while maintaining the annularly arranged shape in the punching to form n number of (where $n \geq 2$) annularly arranged laminates, by matching an i-th annularly arranged laminate among the n number of annularly arranged laminates with a first annularly arranged laminate at a location of the magnetic pole tooth portions in the circumferential direction, and by stacking the i-th annularly arranged laminate in a state where the i-th annularly arranged laminate is rotated in a certain direction by a predetermined angle $\alpha i$ (where $0 < \alpha i < 2\pi$ and $i=2$ to n) with respect to the first annularly arranged laminate; and forming the stator core so as to arrange the rotatably connected split cores in the annular shape by rotatably connecting the adjacent split cores one another by the caulking concavo-convex portions formed on the surface of the first ends of the yokes of the split cores in an overlapped portion in which the first ends of the yokes of the split cores overlap in a stack direction with the first ends of the yokes of the adjacent split cores in the circumferential direction.

2. The method according to claim 1, wherein the split core members forming the n number of annularly arranged laminates are punched under a common punching condition, and thus the n number of annularly arranged laminates have a common shape asymmetry.

3. The method according to claim 1, wherein on the assumption that a magnitude Ti of a torque pulsation component of the i-th annularly arranged laminate is known, the angle $\alpha i$ (where $i=1$ to n and $\alpha 1=0$) is set to satisfy the below expression:

$$\sum_{i=1}^{n} Ti \cdot \exp(j\alpha i \cdot p) = 0.$$

4. The method according to claim 3, wherein the split core members forming the n number of annularly arranged laminates are formed by punching the steel sheets having a common magnetic anisotropy property, and the magnitude Ti is proportional to a stack thickness of the i-th annularly arranged laminate.

5. The method according to claim 1, wherein on the assumption that a magnitude Ti of a torque pulsation component of the i-th annularly arranged laminate is known and the maxim value of the magnitude Ti is a MAX(Ti), the angle of (where $i=1$ to n and $\alpha 1=0$) is set so that a magnitude of a resultant torque pulsation component defined by the below expression is smaller than the MAX(Ti):

$$\sum_{i=1}^{n} Ti \cdot \exp(j\alpha i \cdot p).$$

6. The method according to claim 5, wherein the split core members forming the n number of annularly arranged laminates are formed by punching the steel sheets having a common magnetic anisotropy property, and the magnitude Ti is proportional to a stack thickness of the i-th annularly arranged laminate.

7. The method according to claim 1, wherein on the assumption that a stack thickness of the i-th annularly arranged laminate is hi, a magnitude Ti (where $i=1$ to n) of a torque pulsation component corresponding to hi and caused by the shape asymmetry of the annularly arranged laminates is known, and a torque pulsation caused by an asymmetric property of stress applied commonly to the annularly arranged laminates forming the stator core is known, a magnitude of the resultant torque pulsation defined by the below expression and caused by the shape asymmetry is the same as a magnitude of the torque pulsation caused by the asymmetric property of the stress, and the respective stack thicknesses hi of the n number of annularly arranged laminates forming the stator core and respective angles $\alpha i$ (where i=1 to n and $\alpha 1=0$) in stack are set so that the phases of torque pulsation components are inverse one another in a magnetic pole angle:

$$\sum_{i=1}^{n} Ti \cdot \exp(j\alpha i \cdot p).$$

8. The method according to claim 1, wherein the angle $\alpha i$ (where i=1 to n and $\alpha 1=0$) is set to satisfy $\alpha i = 2\pi \cdot t/s$ (where t is an integer in $0 \leq t \leq s-1$ and s is the number of slots).

9. The method according to claim 1, wherein on the assumption that n is 2, the stack thicknesses of the annularly arranged laminates are equal to each other, the number of slots s is 12, and the number of poles of the rotor is 10, an angle $\alpha 2$ of the annularly arranged laminates is set to $\pi/2$.

10. The method according to claim 1, wherein on the assumption that n is 3, the stack thicknesses of the annular arranged laminates are equal to each other, the number of slots s is 12, and the number of poles of the rotor is 8, angles $\alpha 2$ and $\alpha 3$ of the other annularly arranged laminates with respect to one annularly arranged laminate among the annular arranged laminates are set to $\pi/6$ and $\pi/3$, respectively.

* * * * *